United States Patent
Rudolph

(10) Patent No.: US 10,083,595 B2
(45) Date of Patent: *Sep. 25, 2018

(54) SYSTEM AND METHOD FOR ALERTING A USER UPON DEPARTING A VEHICLE

(71) Applicant: Stewart Rudolph, Levittown, NY (US)

(72) Inventor: Stewart Rudolph, Levittown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,980

(22) Filed: Jan. 24, 2017

(65) Prior Publication Data

US 2017/0132905 A1 May 11, 2017

Related U.S. Application Data

(63) Continuation of application No. 14/929,591, filed on Nov. 2, 2015, now Pat. No. 9,552,717.

(60) Provisional application No. 62/073,162, filed on Oct. 31, 2014.

(51) Int. Cl.
| | |
|---|---|
| *B60Q 1/00* | (2006.01) |
| *G08B 21/24* | (2006.01) |
| *H04W 4/00* | (2018.01) |
| *H04W 4/80* | (2018.01) |

(52) U.S. Cl.
CPC ............ *G08B 21/24* (2013.01); *H04W 4/008* (2013.01); *H04W 4/80* (2018.02)

(58) Field of Classification Search
CPC .......... G08B 21/00; G08B 23/00; G08B 1/00; B60Q 9/00
USPC ................. 340/457, 500, 539.11, 568.2, 531
See application file for complete search history.

(56) References Cited

U.S. PATENT DOCUMENTS

| | | | |
|---|---|---|---|
| 5,689,238 A | 11/1997 | Cannon, Jr. et al. | |
| 6,870,483 B1 | 3/2005 | Davis | |
| 6,996,402 B2 * | 2/2006 | Logan | G06F 3/002 340/10.2 |
| 7,323,988 B2 * | 1/2008 | Krstulich | G08B 13/1427 340/539.13 |
| 7,535,357 B2 * | 5/2009 | Enitan | G08B 13/1427 340/539.11 |
| 7,952,476 B1 | 5/2011 | Causey et al. | |
| 7,973,657 B2 * | 7/2011 | Ayed | G08B 21/0277 340/539.11 |
| D651,590 S | 1/2012 | Kang et al. | |
| 8,112,037 B2 | 2/2012 | Ketari | |
| 8,570,168 B2 * | 10/2013 | Logan | H04Q 9/00 340/539.32 |
| 8,629,767 B2 * | 1/2014 | Stefanovski | B60R 25/24 340/425.5 |
| 8,787,590 B2 * | 7/2014 | Watson | B60R 1/12 381/122 |

(Continued)

*Primary Examiner* — Eric M Blount
(74) *Attorney, Agent, or Firm* — Malloy & Malloy, PL

(57) ABSTRACT

A system for alerting a user of a device departing a vehicle includes a software application configured to be executed on a memory of the device. The software application performs an initial query phase to periodically query the status of a data connection between the device and the vehicle. Upon confirmation that a data connection has been established, the software application engages an armed state and periodically queries for a failure of the data connection between the device and the vehicle. Upon detecting a failure of the data connection the software application engages an alert state operative to alert a user upon failure of said data connection between the device and the vehicle.

7 Claims, 4 Drawing Sheets

(56) References Cited

U.S. PATENT DOCUMENTS

| | | | |
|---|---|---|---|
| 8,855,672 B1 | 10/2014 | Cohn et al. | |
| 8,917,174 B2 * | 12/2014 | Morgan, Jr. | H04W 4/046 340/425.5 |
| 8,941,478 B2 * | 1/2015 | Mirle | B60R 16/02 340/384.1 |
| 8,947,222 B2 * | 2/2015 | DeLuca | A45C 13/18 340/457 |
| 9,224,096 B2 * | 12/2015 | Oppenheimer | G06F 21/50 |
| 9,327,645 B2 * | 5/2016 | Raman | B60Q 9/00 |
| 9,552,717 B1 * | 1/2017 | Rudolph | H04W 4/008 |
| 2002/0094784 A1 * | 7/2002 | Kashu | H04M 1/72519 455/67.11 |
| 2005/0275534 A1 | 12/2005 | Ameen | |
| 2006/0293090 A1 | 12/2006 | Adams et al. | |
| 2007/0086579 A1 * | 4/2007 | Lorello | H04M 3/42263 379/45 |
| 2010/0173615 A1 | 7/2010 | Harris | |
| 2011/0077025 A1 | 3/2011 | Kudo | |
| 2011/0169654 A1 * | 7/2011 | Ketari | G08B 13/1427 340/687 |
| 2011/0175722 A1 | 7/2011 | Jensen et al. | |
| 2011/0282697 A1 * | 11/2011 | Fitzgerald | G06F 21/88 705/4 |
| 2011/0313922 A1 * | 12/2011 | Ben Ayed | G06Q 20/108 705/42 |
| 2012/0218103 A1 * | 8/2012 | Alves | G08B 21/24 340/539.32 |
| 2012/0225633 A1 | 9/2012 | Nichols | |
| 2013/0143546 A1 | 6/2013 | Ricci | |
| 2013/0257604 A1 * | 10/2013 | Mirle | B60R 16/02 340/425.5 |
| 2013/0336094 A1 | 12/2013 | Gruteser et al. | |
| 2014/0176319 A1 | 6/2014 | Nadgauda | |
| 2015/0054647 A1 | 2/2015 | Edwards | |
| 2015/0279195 A1 | 10/2015 | Qian | |

* cited by examiner

SYSTEM AND METHOD FOR ALERTING A USER UPON DEPARTING A VEHICLE

CLAIM OF PRIORITY

The present non-provisional patent application is a continuation application of previously filed U.S. application Ser. No. 14/929,591 which is set to mature into U.S. Pat. No. 9,552,717 on Jan. 24, 2017, which claims priority pursuant to 35 U.S.C. § 119(e) to currently and prior filed provisional patent application having Ser. No. 62/073,162 filed on Oct. 31, 2014, the contents of which are explicitly incorporated herein by reference in their entirety.

BACKGROUND OF THE INVENTION

Field of the Invention

The present invention is directed to methods and systems for causing a mobile device to emit an alert upon failure of a data connection or initiation of a data connection. Specific embodiments of the present invention are directed to a data connection between a mobile device and a vehicle.

Description of the Related Art

Though many users typically carry a mobile device in a pocket or purse, an operator of a mobile vehicle may remove the device in order to, e.g., retrieve navigation directions, select media, transmit a message, or the like, and place the mobile device in a cup holder, on the passenger seat, or in another easily reachable location on or within the vehicle. Alternatively, some users may remove the mobile device from a pocket for purposes of comfort while travelling. In any case, removal of the mobile device from its usual storage location and placement within the vehicle may result in the user departing the vehicle without the mobile device, perhaps because the user lost cognizance of the device during the journey, or perhaps because the device shifted in location and is no longer within view of the user, or a variety of other reasons. As such, there is a need within the art to provide for an alert or reminder to a user to retrieve the device upon departing the vehicle. Such a system may prevent later inconvenience to a user upon the user discovering it is no longer in possession of the mobile device. Additionally, such an invention may facilitate location of the device within a vehicle should it become lost or irretrievable. Lastly, such an invention can reduce the number of thefts occurring due to leaving valuable devices within a vehicle that are easily viewed from outside the vehicle. Such a reduction in theft could lead to economic prosperity as costs of, e.g., identity theft and vehicle insurance claims would also decrease.

SUMMARY OF THE INVENTION

The present invention is directed to a system and method for alerting a user to retrieve a mobile device upon departing a vehicle and preventing the user from leaving the mobile device in the vehicle. As such, one embodiment of the present invention may utilize existing technological standards implemented by vehicle and mobile device manufacturers which provide connectivity between vehicles and mobile devices. For example, many mobile devices, such as mobile phones, tablet computers, laptop computers, PDAs, wearables such as a smart watches, or the like, are provided with software and transceivers that comply with at least some of the various standards put forth by the BLUETOOTH Special Interest Group pertaining to its BLUETOOTH wireless communication standards. Accordingly, many vehicle manufacturers have also provided transceivers and software that comply with BLUETOOTH wireless communication standards in order to provide for enhanced interactivity between a mobile device and the vehicle such as hands free calling and playing of media files stored on or retrieved by the mobile device. It will be appreciated, however, that the present invention may be configured with regard to virtually any data connection standard or wireless communication standard, including, but certainly not limited to, BLUETOOTH, BLUETOOTH Low Energy, Wi-Fi (802.11), 802.15, 1902.1, Near Field Communication, iBEACON, ZIGBEE, and other radio frequency wireless communication standards. Additionally, a data connection of the present invention may comprise a hardwired connection, such as that provided by a charging/data cable of a mobile device which may be connected to an appropriate receptacle of the vehicle. Such a hardwired connection may comprise USB (A, B, or C), USB mini, USB micro, APPLE 30-Pin, APPLE LIGHTNING, and the like.

In one embodiment, the present invention comprises a method for alerting a user upon departing a vehicle that the user may be leaving a mobile device within the vehicle. Accordingly the method includes establishing a data connection between the mobile device and the vehicle, periodically or continuously monitoring the data connection, and providing an alert to a user upon failure or severing of the data connection. In one embodiment, the data connection may comprise a wireless communication channel, such as a BLUETOOTH connection between the mobile device and the vehicle. The method includes monitoring either the mobile device or the vehicle, or both, to ascertain whether the mobile device and vehicle have established a BLUETOOTH connection. Upon confirming the BLUETOOTH connection, the method may include causing the mobile device to emit an alert, and further to continue monitoring either the mobile device or the vehicle, or both, to ascertain whether the mobile device and the vehicle have maintained the BLUETOOTH connection or severed the BLUETOOTH connection. Upon confirming that the connection has been severed, an alert is provided to the user. In at least one embodiment, the alert is operative to notify or remind the user that the user may be leaving a mobile device in the vehicle upon departing the vehicle. A severing of the connection may occur, for example, when the vehicle is disabled, such as when the ignition is switched off. In certain vehicles, even when the ignition is switched off, electrical power is still routed to certain systems of the vehicle until a further action is taken, such as opening of the driver's door, and a severing of the connection may occur at that point.

The alert may be an audible alert and may comprise a pre-recorded sound file that is projected at an appropriate time such as a recording of the word "PHONE." Additionally, the alert may comprise a visual component such as a graphical component displayed on a graphical display of the mobile device. The visual component may also utilize a flash assembly of the mobile device, such as an LED bulb to provide a visual component, particularly at night or when the interior of the vehicle is otherwise dark or unlit. The alert may also utilize a vibration assembly of the mobile device to provide additional alert to the user.

In one embodiment, the present invention is directed to a system that includes a software application which may be downloaded, installed, or otherwise provided to a mobile device of which a user desires. The user may then open the application while in proximity to the desired vehicle and initiate the BLUETOOTH pairing process between the device and the vehicle. In alternative embodiments, where the desired device and vehicle are already bonded prior to provision of the application to the device, the application may be configured to retrieve such device settings from the device and integrate same within its operation.

Then the software application may be initiated, in which it may begin an initial query phase, which may include periodically querying for establishment of a data connection, which, in a preferred embodiment, can comprise establishment of a wireless communication channel or data connection between the mobile device and a vehicle. In a further preferred embodiment, the wireless communication channel can comprise a BLUETOOTH connection. It will be appreciated, however, that though a preferred embodiment may include use of the BLUETOOTH wireless standard, virtually any standard for communication can be utilized in conjunction with the systems and methods set forth herein.

In at least one embodiment, the software application may be configured as a background process, such as a daemon. In other words, the software application may be executed on the device while other processes are running and even when the user is not interacting with a user interface of the software application. As such, the software application may be initiated a first time, and then continuously monitor for establishment of a data connection until the connection is established or a user disables the software application.

Upon confirming that the mobile device has established a data connection, or wireless communication channel, with the vehicle, the software application may then initiate an armed state, whereby the software application is operative to periodically query whether the mobile device has maintained the data connection or wireless communication channel.

Upon a failure of the data connection or wireless communication channel, the software application may then be operative to initiate an alert state. The alert state may at least partially comprise an alert detectable by a user of either the vehicle, the mobile device, or both. The alert may be operative to notify or remind a user that is departing the vehicle that the user may be leaving the mobile device in the vehicle. For example, the alert state may include broadcasting any of a plurality of sound files, audible to the user, which may include audible alerts such as "PHONE". Additionally, the alert state may include visual cues, such as initiation of an LED Flash on the mobile device or a brightened screen display. A display of the mobile device may also be configured to display an image or text regarding the mobile device. Lastly, the alert state may include activation of the mobile device's vibration assembly.

In one embodiment, the alert state may comprise a single alert phase, in which the alert is activated for a predetermined time period or number of alert cycles, before automatic deactivation of the alert state. In alternative embodiments, the alert state may comprise a continuous alert phase in which the alert is activated until disabled by a user by, e.g., tapping a display of the device.

Once the alert state is deactivated, the software application is then operative to re-initiate the initial query phase, such that a user need not manually initiate the initial query phase.

In one embodiment the software application may include a user interface which may facilitate initial set-up of the software application as well as user adjustable settings for the software application. In at least one embodiment, the user interface may include a set of instructions which assists the user in pairing and bonding the device with the desired vehicle. Additionally, where the user has already bonded the device with one or more vehicles, the user interface may include a list of such vehicles and provide for selection of such vehicles which the user desires the software application to alert the user. Furthermore, the user interface may provide user adjustable settings, such as adjustment for the length or volume of the alert; types of alerts desired such as audible, visual, vibrate, etc.; selection of desired audible alert noises, visual alert cues, and the like. In certain embodiments the software application may be provided to a user for free, but require payment, or other recompense, before allowing the user to access one or more of the user adjustable settings.

In another embodiment, the software application of the present invention may alternatively be provided to the vehicle, instead of, or in addition to, the mobile device. As such, the software application can be configured to be executed on a memory of the vehicle, substantially as recited above, such as within an Electronic Control Module of the vehicle or otherwise integrated with the controller area network (CAN bus) of the vehicle. Additionally, alerts may be provided from the vehicle instead of, or in addition to, the mobile device.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
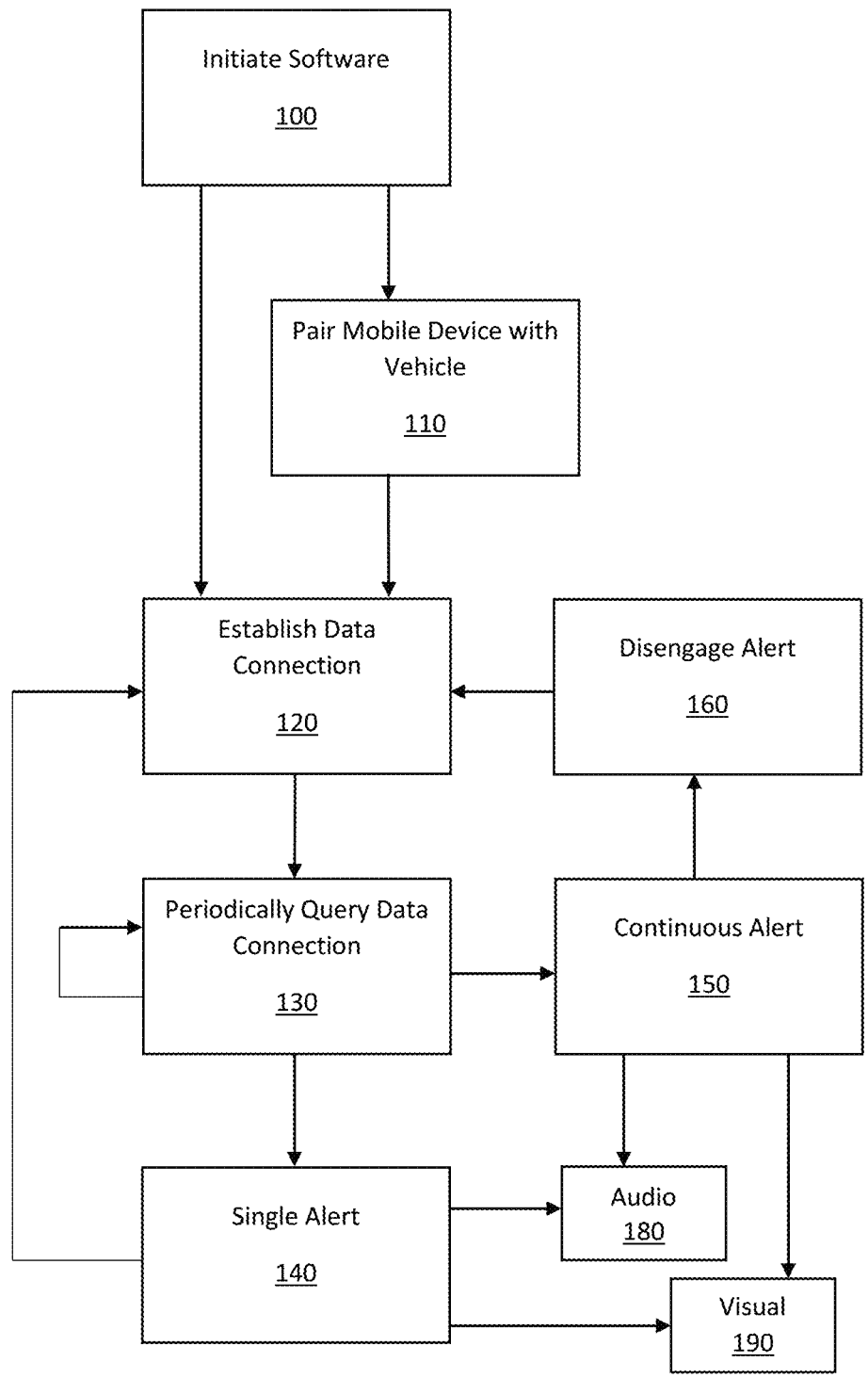
FIG. 1 is a chart illustrating operative steps of the method of the present invention according to one embodiment thereof.

With reference to FIG. 1, one method of the present invention according to at least one embodiment is presented. Therein a first step of the method may comprise initiating software 100 which is provided to a mobile device. The step of initiating software 100 may include providing the software to the mobile device, via download for example. It may also include pairing the mobile device with a vehicle 110, if not previously paired with a vehicle. Accordingly, embodiments wherein the data connection is accomplished via BLUETOOTH, may include pairing and bonding the mobile device with the vehicle such that the mobile device may automatically establish a data connection 120 with the vehicle via BLUETOOTH when available. Otherwise, if the mobile device has been previously paired with one or more vehicles, the step of initiating the software 100 may include selecting which vehicle the software will be operative with. In additional embodiments, the step of initiating the software 100 may include selection of various user settings such as desired alert phase behaviors such as audio or visual alerts.

In at least one embodiment, establishing a data connection 120 may be accomplished via a wireless communication channel between the mobile device and the vehicle, such as that complying with BLUETOOTH standards, and may also be initiated automatically by either the mobile device or vehicle upon ignition of the vehicle.

After establishing a data connection 120, the method further includes periodically querying the data connection 130 to ascertain whether the data connection has been maintained or severed. If the data connection is maintained, then the data connection is queried again after a predetermined period. If the data connection has been severed, the method then provides that an alert be provided to a user of the method, which in at least one embodiment may be a single alert 140 or, in alternative embodiments, a continuous alert 150 requiring disengagement 160. The alert may include an audio component 180, a visual component 190, or both.

In at least one preferred embodiment, the method also provides that no further user interaction be required after the alert 140, 150 (or disengagement 160 thereof) in order to prepare the method for the next time a mobile device is placed within a vehicle. Stated otherwise, the method includes an automatic reset after alert, whereby the method is operative to periodically query the data connection 130 without further user input or interaction.

Figure 2:
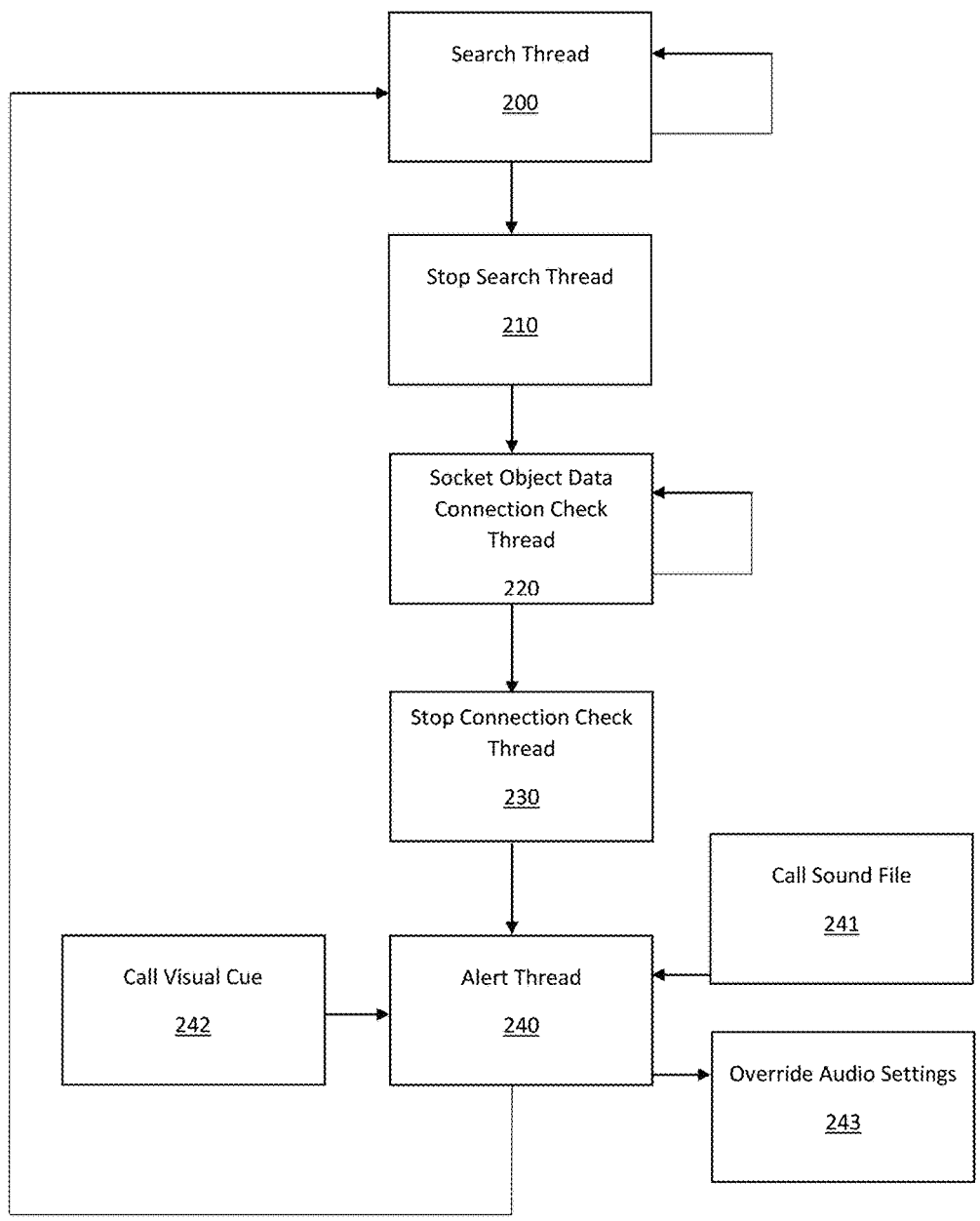
FIG. 2 is a chart illustrating operative steps of a software application according to one embodiment of the present invention.

With reference to FIG. 2, the present invention is also directed to a software application comprising a set of machine readable instructions executable on a memory of a mobile device. In one embodiment, the software application includes a search thread 200. The search thread 200 may include such machine readable instructions executable on a memory of a mobile device as are operative to cause the mobile device to search for a data connection between the mobile device and a vehicle, such as a BLUETOOTH wireless communication channel. If no such data connection is detected, the search thread 200 may continue to search for such a connection. Upon detection of the data connection, however, the software instructions may be operative to stop the search thread 210 and begin a connection check of the data connection socket object 220, which in at least one embodiment may comprise a BLUETOOTH socket object. If the check passes, wherein the presence of the data connection socket object is confirmed, the software instructions may be operative to wait a predetermined period and begin the check again. If the check fails, wherein the presence of the data connection socket object is not confirmed, the software instruction may be operative to stop the connection check thread 230 and begin an alert thread 240.

The alert thread 240 may incorporate calling a predetermined sound file 241 to be broadcast to a user, calling a visual cue 242 to be displayed to a user, and providing the alert to the user, which may include broadcast of the sound file, display of the visual cue, or both. In an additional embodiment, the alert thread 240 may be operative to override any audio settings 243, such as mute, silence, or vibrate, in order to provide the user with an alert, despite any previous commands to the mobile device. Once the alert thread 240 has completed at least one cycle, or in alternative embodiments, once the alert thread 240 has been manually defeated by a user, the software instructions are operative to re-initiate the search thread 200, such that the present invention will be operative without further input from a user.

Figure 3:
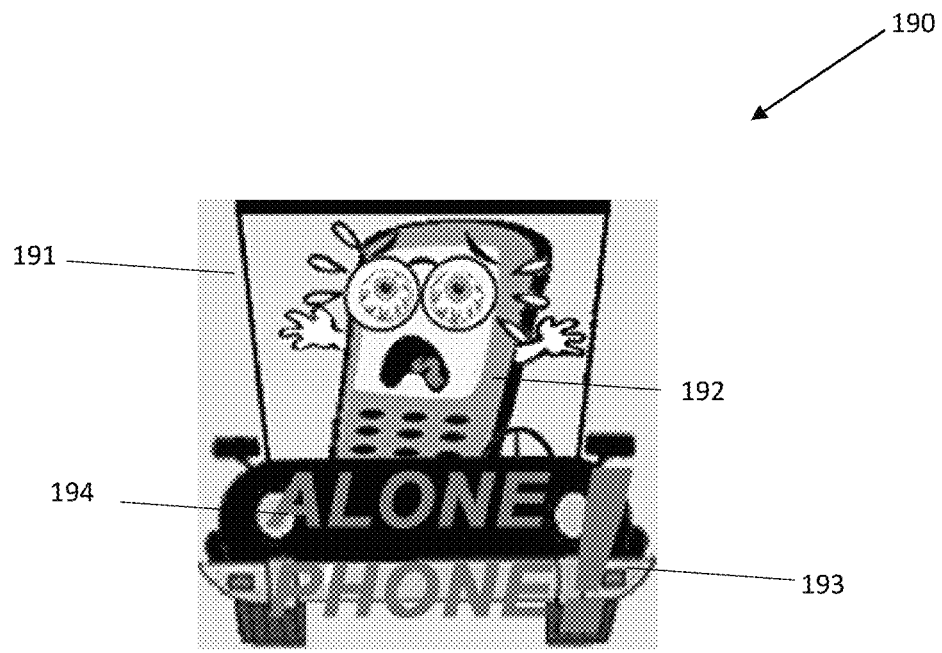
FIG. 3 is a depiction of a visual cue according to one embodiment of the present invention.

FIG. 3 is a depiction of a visual component 190 of an alert according to one embodiment of the present invention. The depicted embodiment includes a graphical display 191 which may be displayed on a display of the mobile device used in connection with the present invention as part of a visual component 190 of an alert thereof. The graphical display 191 includes a depiction of a mobile device 192 and a depiction of a vehicle 193. The graphical display 191 may also include a text component 194 as well. The depiction of the mobile device 192 also includes a personification thereof, which is intended to appear under duress. As such, the intent of the depicted embodiment is to provide a humorous, but explicit, reminder or notification to a user that the user may be departing a vehicle without the mobile device. Accordingly, the graphical display 191 of the present invention can be distinguished from, e.g., a visual notification that the mobile device has lost a connection with a BLUETOOTH device, which may be operative to draw a user's attention to the mobile device, but is not explicit in its notification or reminder that the user may be departing the vehicle without the mobile device.

It will be appreciated that the graphical display 191 depicted in FIG. 3 is but one embodiment of the present invention, and that such humorous depictions are not necessary to the operation of the present invention, but are merely utilized in one embodiment. Other explicit reminders or notifications may or may not include depictions of mobile devices 192, depictions of vehicles 193, or text components 194. In yet further embodiments, the visual component may also include activation of a light emitting diode of the mobile device or activation of a vibration assembly of the mobile device.

Figure 4:
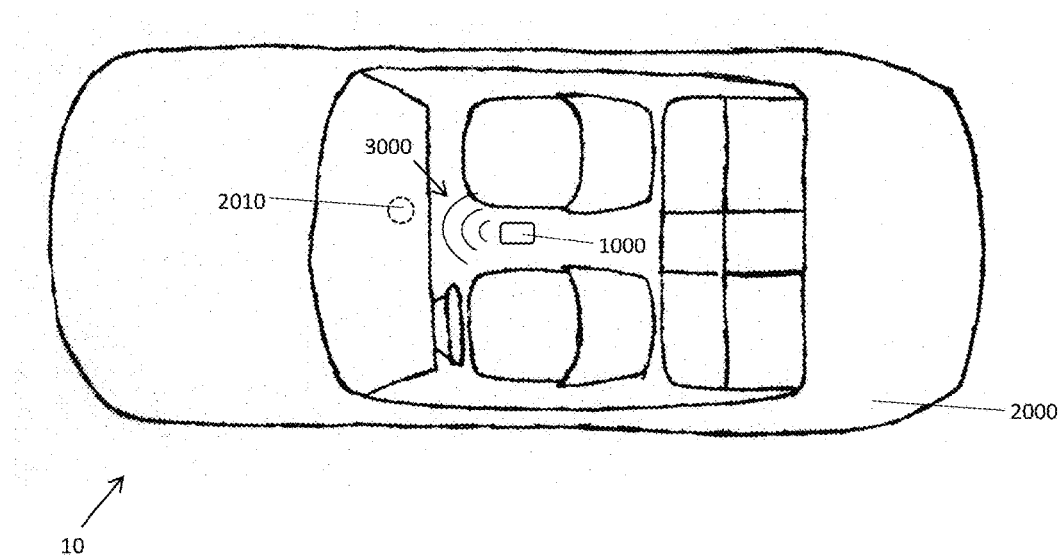
FIG. 4 is a schematic of a vehicle and mobile device in accordance with one embodiment of the present invention.
Figure 5:
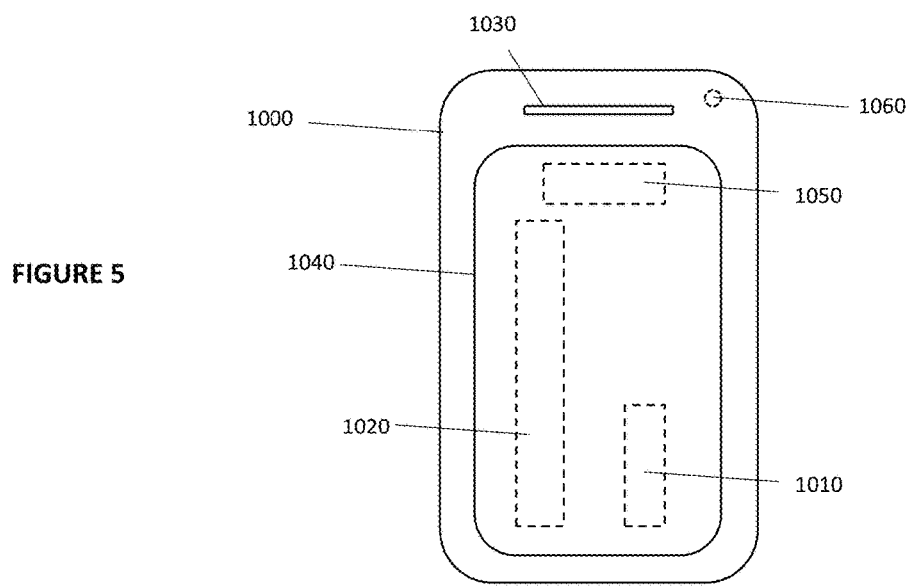
FIG. 5 is a schematic of a mobile device in accordance with one embodiment of the present invention.

With reference to FIGS. 4 and 5, the system 10 of the present invention comprises the use of a mobile device 1000 and vehicle 2000. In at least one embodiment, the mobile device includes a memory 1010 upon which machine readable instructions may be at least temporarily stored and/or executed, a wireless communication assembly 1020, and a speaker assembly 1030 for facilitating the provision of audible alerts. In additional embodiments the present invention may utilize a mobile device 1000 including graphical display 1040 such as an LCD or LED screen for displaying at least visual cues and a user interface of the present invention. The mobile device and/or user interface may also include a vibration assembly 1050 which may be utilized to cause the mobile device to vibrate, and a flash assembly 1060, such as an LED camera flash for use in connection with visual cues. The present invention also utilizes a vehicle 2000 with at least a wireless communication assembly 2010. Components depicted in dashed lines indicate components that are disposed behind or beneath other objects depicted in the respective Figure. The wireless communication assembly 1020 of the mobile device 1000 and the wireless communication assembly 2010 of the vehicle 2000 may be cooperatively configured to establish a wireless communication channel (symbolized via the radio waves 3000) between the mobile device 1000 and the vehicle 2000.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A system for alerting a user of a mobile device, the system comprising:
    a software application configured to be executed on a memory of the mobile device;
    said software application comprising an initial query phase operative to determine the status of a data connection between the mobile device and a vehicle;
    said initial query phase further operative to emit an alert upon determining an establishment of said data connection;
    said establishment of said data connection being associated with an ignition of the vehicle;
    said software application further comprising an armed state to determine when a failure of said data connection between the mobile device and the vehicle has occurred; and
    said software application further comprising an alert state operative to emit an alert upon failure of said data connection.

2. The system as recited in claim 1 wherein said alert is emitted from the mobile device.

3. The system as recited in claim 1 wherein said alert is emitted from the vehicle.

4. A system for alerting a user of a mobile device, the system comprising:
    a software application configured to be executed on a memory of the mobile device;
    said software application comprising an initial query phase operative to determine the status of a data connection between the mobile device and a vehicle;
    said software application further comprising an armed state to determine when a failure of said data connection between the mobile device and the vehicle has occurred;
    said failure of said data connection being associated with a disabling of the vehicle ignition
    said software application further comprising an alert state operative to emit an alert upon failure of said data connection.

5. The system as recited in claim 1 wherein said initial query phase comprises said software application operatively testing for the establishment of a wireless communication channel between the device and the vehicle; said armed state comprises said software application operatively testing for the failure of a wireless communication channel between the device and the vehicle.

6. The system as recited in claim 4 wherein said alert is emitted from the mobile device.

7. The system as recited in claim 4 wherein said alert is emitted from the vehicle.

* * * * *